(12) United States Patent
Fishman et al.

(10) Patent No.: US 11,146,079 B2
(45) Date of Patent: Oct. 12, 2021

(54) BI-DIRECTIONAL OPTIMIZERS FOR BATTERY STORAGE SYSTEMS WITH GALVANIC ISOLATION

(71) Applicant: Alencon Acquisition Co., LLC, Hatboro, PA (US)

(72) Inventors: Oleg S. Fishman, Maple Glen, PA (US); Zekeriya Dereli, Hatboro, PA (US); David Luksenberg, Penn Valley, PA (US); Hanan Fishman, Fort Washington, PA (US)

(73) Assignee: Alencon Acquisition Co., LLC, Hatboro, PA (US)

( * ) Notice: Subject to any disclaimer, the term of this patent is extended or adjusted under 35 U.S.C. 154(b) by 373 days.

(21) Appl. No.: 16/423,256

(22) Filed: May 28, 2019

(65) Prior Publication Data

US 2019/0372361 A1    Dec. 5, 2019

Related U.S. Application Data

(60) Provisional application No. 62/677,255, filed on May 29, 2018.

(51) Int. Cl.
*H02J 7/00* (2006.01)
*H02M 3/335* (2006.01)
*H02J 7/02* (2016.01)

(52) U.S. Cl.
CPC .......... *H02J 7/0021* (2013.01); *H02J 7/0072* (2013.01); *H02J 7/022* (2013.01); *H02M 3/335* (2013.01)

(58) Field of Classification Search
None
See application file for complete search history.

(56) References Cited

U.S. PATENT DOCUMENTS

| | | | |
|---|---|---|---|
| 6,188,199 B1 * | 2/2001 | Beutler | H02J 7/34 320/125 |
| 11,070,065 B2 * | 7/2021 | Abdel-Monem | G01R 31/392 |
| 2004/0189248 A1 * | 9/2004 | Boskovitch | H02J 7/0048 320/116 |
| 2006/0279255 A1 * | 12/2006 | Yoshida | H02J 7/0048 320/116 |
| 2010/0121511 A1 * | 5/2010 | Onnerud | B60L 58/15 701/22 |
| 2012/0104861 A1 | 5/2012 | Kojori et al. | |
| 2013/0234669 A1 | 9/2013 | Huang et al. | |
| 2013/0314024 A1 * | 11/2013 | Proebstle | H02J 7/342 320/105 |
| 2015/0180323 A1 | 6/2015 | Wagoner et al. | |
| 2015/0326108 A1 * | 11/2015 | Augustoni | H02M 3/158 307/82 |
| 2017/0310120 A1 | 10/2017 | Birkl et al. | |
| 2017/0338651 A1 | 11/2017 | Fishman et al. | |

* cited by examiner

*Primary Examiner* — Arun C Williams
(74) *Attorney, Agent, or Firm* — Philip O. Post

(57) ABSTRACT

Equalization of the state of health of multiple serial strings of battery cells connected in parallel to a common direct current bus in an energy storage system utilized with a utility-sized renewable energy system or other system where optimum operational battery health is a requirement, and in particular is provided by a separate bi-directional DC-to-DC converter in each serial string that controls the charge and discharge of the multiple serial strings of battery cells to maximize efficiency of the stored energy and also provides galvanic isolation between the direct current bus and the multiple serial strings of battery cells.

20 Claims, 12 Drawing Sheets

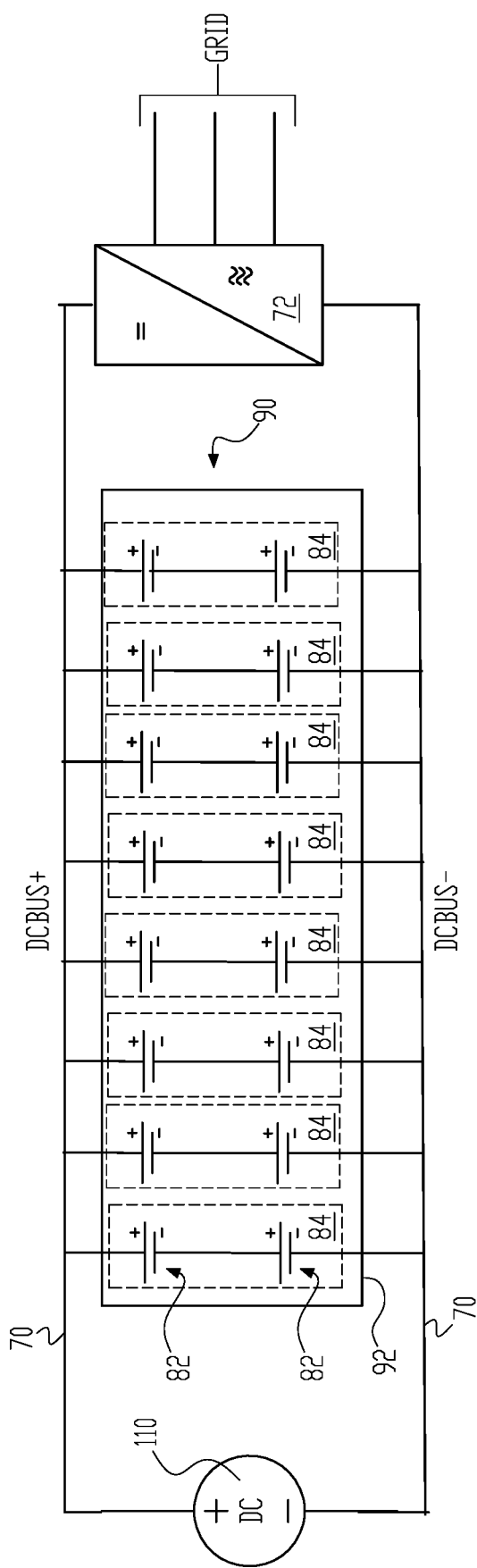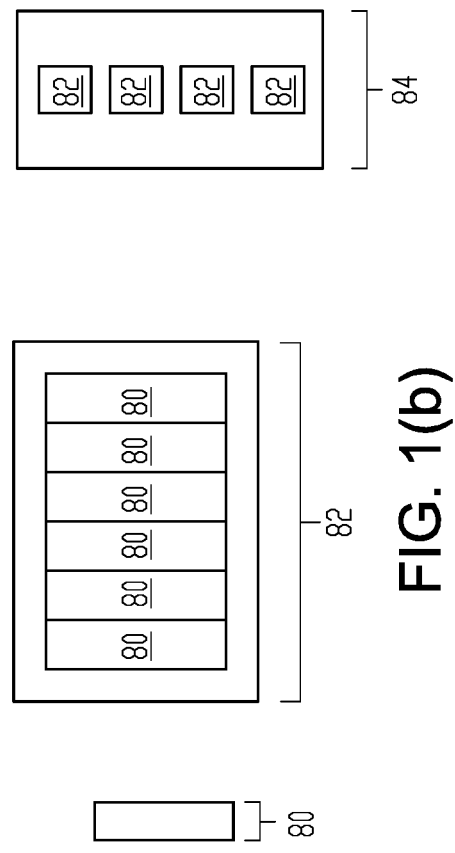
FIG. 1(a)
FIG. 1(b)

BI-DIRECTIONAL OPTIMIZERS FOR BATTERY STORAGE SYSTEMS WITH GALVANIC ISOLATION

CROSS REFERENCE TO RELATED APPLICATIONS

This application claims the benefit of U.S. Provisional Application No. 62/677,255, filed May 29, 2018, hereby incorporated by reference in its entirety.

FIELD OF THE INVENTION

The present invention relates generally to the integration of energy storage systems into alternative energy power systems, including utility-size electric power systems collecting electrical energy from renewable power sources, for supply to an electric grid or other user where optimum operational battery health is a requirement, and in particular, where the alternative energy storage systems utilize multiple strings of battery cells individually connected to a DC bus by which energy is selectively stored or supplied to the electric grid or other user where optimum operational battery health is a requirement.

BACKGROUND OF THE INVENTION

One shortcoming of a utility-scale solar power plant is that time availability of the source of solar power (radiated sun light) does not necessarily coincide with utility power demand on an electrical grid.

The term "utility-scale solar power plant" applies to technology disclosed herein to a plant with a minimum rated design output of at least 100 kilowatts as known in the art.

The above shortcoming also applies to a utility-scale wind power plant where a stored energy source is utilized.

One solution to the above shortcoming is to pair the utility-scale solar power plant with a stored energy source. United States Patent Application Publication No. 2017/0338651 A1 (Fishman et al.) discloses an integrated multimode, large-scale electric power support system that supplies on demand at least 2,500 kW to an electrical grid either from co-located solar or wind renewable energy DC power sources or in combination with, or alternatively, from system stored energy DC power sources via a plurality of DC-to-AC inverters with phase-shifted outputs; U.S. Patent Application Publication No. 2017/0338651 A1 is incorporated herein by reference in its entirety.

One type of stored energy source that can be utilized in an alternative power system is batteries. One type of battery stored energy source comprises an arrangement of lithium-ion batteries. In a typical arrangement as shown in FIG. 1(a) and FIG. 1(b) a plurality of battery cells 80, with each cell representing a single lithium-ion battery, are electrically interconnected in series and/or parallel to form a battery module 82. A plurality of modules are physically installed with a battery rack 84 and electrically interconnected to provide a larger energy output at a required voltage. A plurality (array) of battery racks 84 are electrically interconnected to form an utility-sized stored energy system 90 as illustrated in FIG. 1(a) used with alternative power source (APS). The plurality of racks 84 can be containerized as diagrammatically illustrated by battery system container 92 in FIG. 1(a). Although the technology and invention disclosed herein is described with respect to lithium-ion batteries, it applies in general to other types of batteries as known in the art with applicable variations in arrangements known in the art.

As mentioned above a battery rack 84 is formed from a number of battery modules 82 stacked up with all battery cells in series as represented in FIG. 1(b). The series string of battery cell terminals in each module can have different magnitudes of insulation resistance to the grounded chassis of the module.

Prior art parallel positive cell terminals of the series string of battery cells in each battery rack are connected to the positive DC bus 70 and the negative cell terminals of the series string of battery cells are connected to ground in the alternative energy system shown, for example, in FIG. 1(c).

In general herein the common storage and supply DC bus 70 is referred to as a positive DC bus (DCBUS+) and a negative DC bus (DCBUS−) with the understanding that in particular applications either the positive DC bus or the negative DC bus may be at electrical ground potential and the other DC bus will either be above ground potential (DCBUS− being ground) or below ground potential (DCBUS+ being ground).

The voltage potential across the insulation resistance of the battery cells cause a leakage current to ground and between individual battery cells. Over the lifetime of a battery the insulation resistance may deteriorate. The increased leakage current can heat the battery cells and potentially cause an explosion or other hazardous condition.

In a utility-scale solar power plant, the solar energy collector 111 (for example a plurality of solar cells) as shown, for example in FIG. 1(c), can be regulated by a solar energy collection regulation system and then be connected to the stored energy direct current (DC) bus 70 for either storage or supplied to an alternating current (AC) electrical grid via a suitable DC-to-AC inverter system 72. One example of suitable inverter system is a regulated current source inverter system as disclosed in U.S. Pat. No. 8,212,408 B2 (Fishman) which is incorporated herein by reference in its entirety.

With the large magnitude of electrical energy collected, stored and distributed in a utility-scale solar power plant, maximum optimization of energy in the collection, storage and distribution system becomes a significant factor for consideration.

U.S. Pat. No. 8,212,408 B2 (Fishman) discloses common collection of photovoltaic-generated and wind-generated electric power in a nodal arrangement and transported at high voltage DC to a plurality of regulated current source inverters for supply to the conventional AC electrical transmission system; U.S. Pat. No. 8,212,408 B2 is incorporated herein by reference in its entirety.

U.S. Pat. No. 9,118,215 B2 (Fishman et al.) and U.S. Pat. No. 9,350,166 B2 (Fishman et al.) disclose renewable energy, utility size electric power systems that have high voltage, renewable energy harvesting networks connected by a direct current link to a centralized grid synchronized multiphase regulated current source inverter system. U.S. Pat. Nos. 9,118,215 B2 and 9,350,166 B2 are incorporated herein by reference in their entireties.

A renewable energy system (RES), which is also referred to as an alternative energy system herein, paired with a storage batteries system provides for charging of the batteries with the excess renewable energy and later discharging this energy into an electrical grid on demand.

The term renewable (or alternative) energy storage system as used herein refers to utility-size array of batteries that are capable of accumulating and storing electrical charge and releasing the stored charge at a controlled rate. The individual battery cells are connected in series to form battery modules; a plurality of battery modules are electrically connected together in each of a plurality of battery racks as diagrammatically illustrated, for example, in FIG. 1(a) and FIG. 1(b). The voltages and charge in each individual battery cell is controlled by a battery management system (BMS) with a BMS controller as known in the art.

The addition of battery storage in a solar energy power system increases the utilization of photovoltaic equipment from less than 50 percent to between 90 and 100 percent utilization because with storage the alternative system installation may supply power all time of a day.

As known in the present art, the majority of renewable energy storage systems are deployed with lithium-ion battery technology.

The capacity of lithium-ion batteries to store and discharge electrical energy is measured in KWh. The amount of releasable charge (C releasable) that the battery contains at any given time relative to the maximum capacity of the battery (C max) is defined as the state of charge (SoC) and can be measured as a percentage as determined by Equation 1.

$$SoC = \frac{C \text{ releaseable}}{C \text{ max}} \cdot 100\% \qquad \text{(Equation 1)}$$

Batteries age over time as they experience a number of charge/discharge cycles. As such, their capacity to hold charge diminishes. The degree of degradation of the battery measured as a percentage of maximum capacity of the battery (C max) to the initial rated capacity (C rated) is defined as the state of health (SoH) and can be measured as a percentage as determined by Equation 2.

$$SoH = \frac{C \text{ max}}{C \text{ rated}} \cdot 100\% \qquad \text{(Equation 2)}$$

The state of health of the battery cells in each battery rack can be different. When charging, the battery cells in one battery rack can be charging faster than in another battery rack since C max is lower than the C max in other battery racks. When connected to the same magnitude of DC bus voltage, the battery rack with lower C max will reach C max faster. Similarly during discharge, the battery rack with the lower state of health value will discharge faster. Either overcharging lithium-ion batteries above C max or discharging lithium-ion batteries below zero destroy the battery cells. Consequently parallel connection of battery racks prevents the series string of battery cells in battery racks with a high state of health from reaching full charge capacity, which means the battery racks with a series string of battery cells with a high state of health in parallel connection between the DC bus and electrical ground with battery racks having a series string of battery cells with a low state of health will not reach full utilization.

The distribution of the DC voltage for the lithium-ion battery cells, as well as the monitoring of the state of charge and state of health (among other parameters) is provided by a battery management system (BMS) with a BMS controller as known in the art and supplied by the battery manufacturer for each individual battery rack in the plurality of battery racks that form a utility-sized energy storage system. However, a battery management system as known in the art does not assure that each of the plurality of battery racks is charged evenly; that is, to the same charge percent.

In the current art, the total number of battery cells in each of the plurality of battery racks are connected in parallel between all of the plurality of battery racks 84 in the energy storage system to form a common DC bus 70 for the system as illustrated, for example, in FIG. 1(a), which as mentioned above, can be packaged in a battery container 92. An equal magnitude of DC voltage is applied to all the strings of the array of batteries installed in each battery rack 84. This method of connection of the string of batteries in each battery rack 84 does not assure equilibrium of charge or discharge from the stronger batteries (for example based on state of health) in each rack of batteries.

If components connected to DC bus 70 incidentally short-circuits (grounds) the DC bus all of the batteries connected to the DC bus rapidly discharge into the short circuit causing a high level of short-circuit fault current that can result in a catastrophic event such as a fire or explosion.

In addition to solar energy alternative power systems, the present invention also can be applied to wind energy alternative power systems known in the art as diagrammatically illustrated in FIG. 1(d).

The ground leakage resistance from the negative terminal (battery case) of each battery cell making up the series string of batteries in each rack is different for every battery rack. When, as typically done, all cases of each battery cell are connected to one common terminal may also result in excessive ground leakage current and battery failures leading to dangerous faults.

It is one object of the present invention to provide fine-tuning of controlled charge and discharge to each string of battery cells in each separate battery rack connected to the common DC bus to assure equal state of charge for each series string of battery cells in each battery rack connected to a common DC bus in an alternative energy storage system (for example in a single energy storage system container) to minimize fault current magnitudes and provide galvanic isolation between the string of batteries in each separate battery rack from the string of batteries in the other battery racks in the energy storage system.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1(a) is a simplified diagrammatic of a typical utility-scale alternative energy power plant illustrating a typical energy storage system and a DC-to-AC inverter.

FIG. 1(b) is a simplified diagrammatic of a typical arrangement of electrically interconnected battery cells into a battery module, with a plurality of interconnected battery modules arranged in a battery rack and a plurality of electrically interconnected battery racks arranged in an energy storage system container as shown in FIG. 1(a).

FIG. 2(*b*) is a simplified diagrammatic of one example of a bi-directional optimizer system with galvanic isolation between an energy storage and supply DC bus and a plurality of individual series connected strings of batteries with each of the plurality of individual series connected string of batteries having a separate bi-directional optimizer with galvanic isolation as applied to a typical utility-scale power plant supplied by an alternative energy DC power source where the DC power source is intermittently available.

FIG. 2(*c*) is a simplified diagrammatic of one example of a bi-directional optimizer system with galvanic isolation between an energy storage and supply DC bus and a plurality of individual series connected string of batteries with each of the plurality of individual series connected string of batteries having a separate bi-directional optimizer with galvanic isolation as applied to a utility-scale solar power plant where the DC power source is intermittently available.

FIG. 2(*d*) is a simplified diagrammatic of one example of a bi-directional optimizer system with galvanic isolation between an energy storage and supply DC bus and a plurality of individual series connected string of batteries with each of the plurality of individual series connected string of batteries having a separate bi-directional optimizer with galvanic isolation as applied to a utility-scale wind power plant where the DC power source is intermittently available.

FIG. 3(*b*) illustrates the current flow path when the bi-directional optimizer in FIG. 3(*a*) is in a battery discharge operational mode.

FIG. 4(*b*) is a timing diagram for pertinent components of the bi-directional optimizer for storage systems shown in FIG. 3(*b*) for control of current flow from the plurality of individual series DC bus connected strings of batteries to the DC bus.

FIG. 5(*b*) diagrammatically illustrates one example of a bi-directional optimizer for storage systems of the present invention shown in FIG. 5(*a*) utilizing two half-bridge inverters and two active rectifiers in discharge operational mode.

BRIEF SUMMARY OF THE INVENTION

Figure 1C:
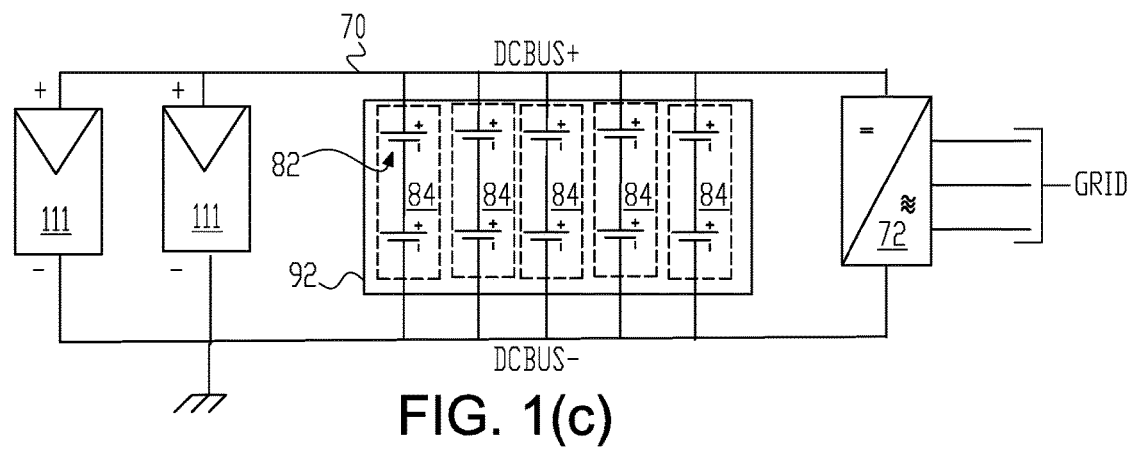
FIG. 1(c) is a simplified diagrammatic of a typical utility-scale solar energy power plant illustrating a typical energy storage system and a DC-to-AC inverter with two of a plurality of solar energy collectors 111 connected to a DC bus.
Figure 1D:
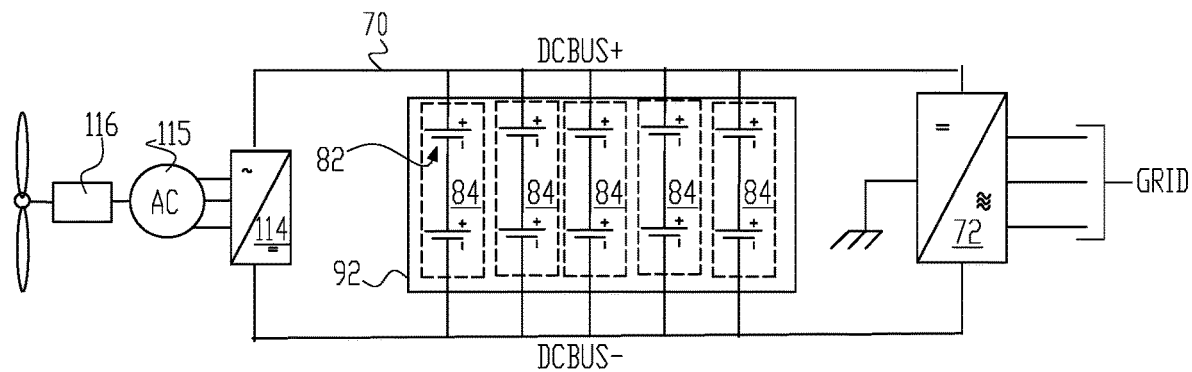
FIG. 1(d) is a simplified diagrammatic of a typical utility-scale wind energy power plant illustrating a typical energy storage system and a DC-to-AC inverter with one of a plurality of wind turbine power sources comprising wind turbine/gear box 116, AC generator 115 and motor side converter (MSC) 14 connected to a DC bus.
Figure 2A:
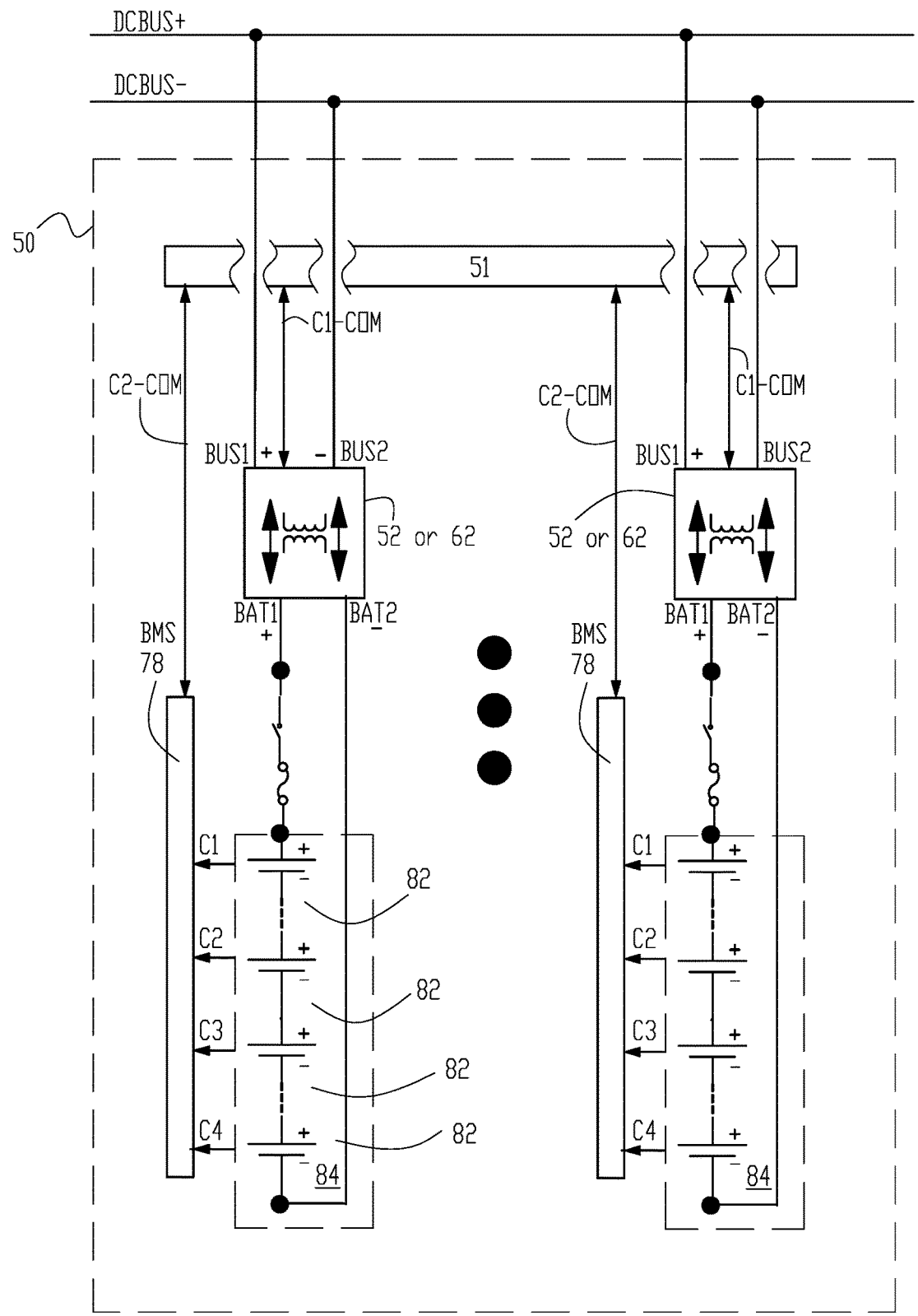
FIG. 2(*a*) is a simplified diagrammatic of one example of an optimized battery state of health sustaining system of the present invention with a bi-directional optimizer system having galvanic isolation between an energy storage and supply DC bus and a plurality of individual series connected strings of batteries with each of the plurality of individual series connected string of batteries having a separate bi-directional optimizer with galvanic isolation as applied to the alternative energy systems in FIG. 2(*b*) through FIG. 2(*d*). As indicated by the three solid dots in FIG. 2(*a*) the plurality of individual series connected string of batteries is from one to any plurality as required in a particular application.
Figure 2B:
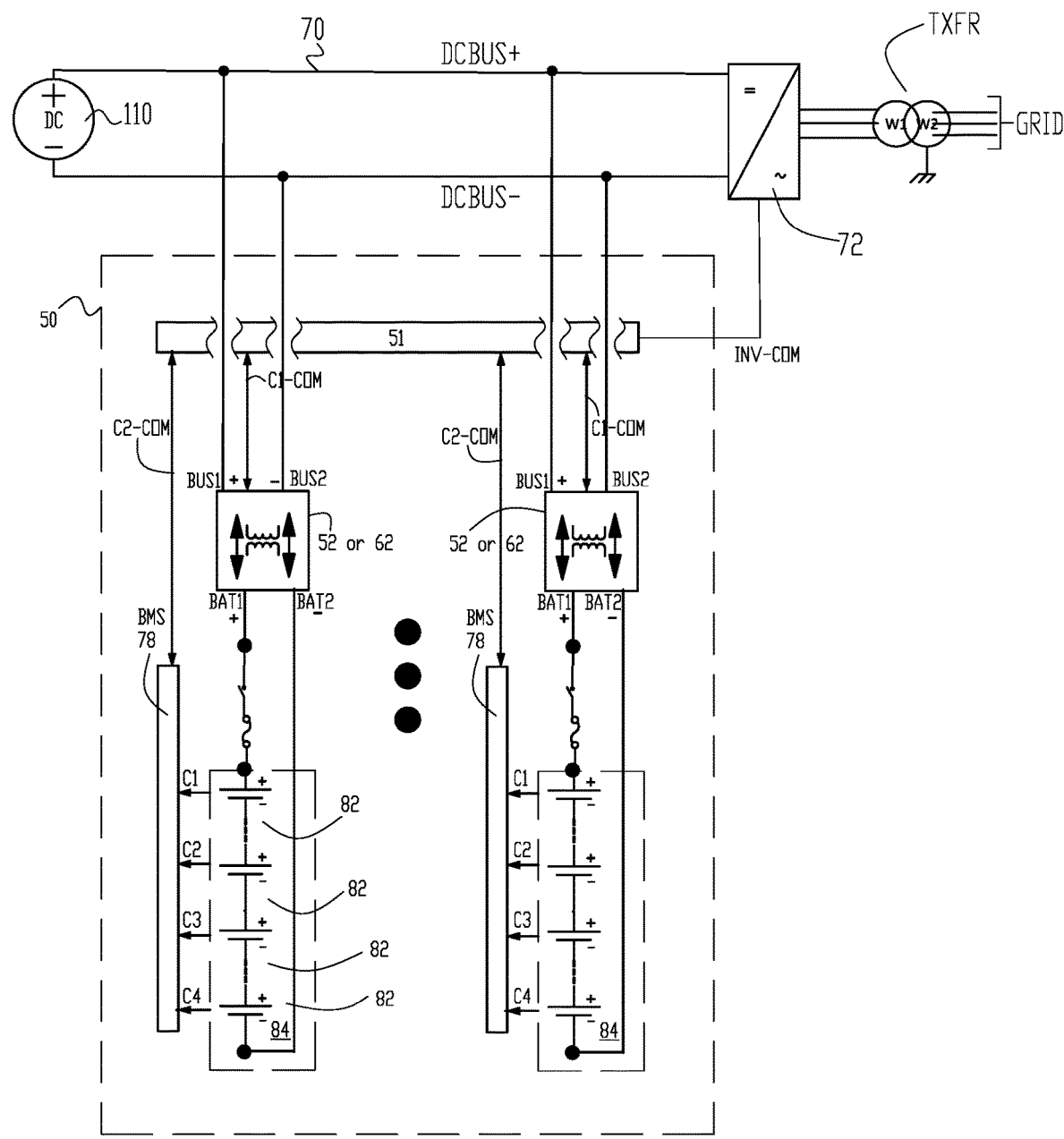
Figure 2C:
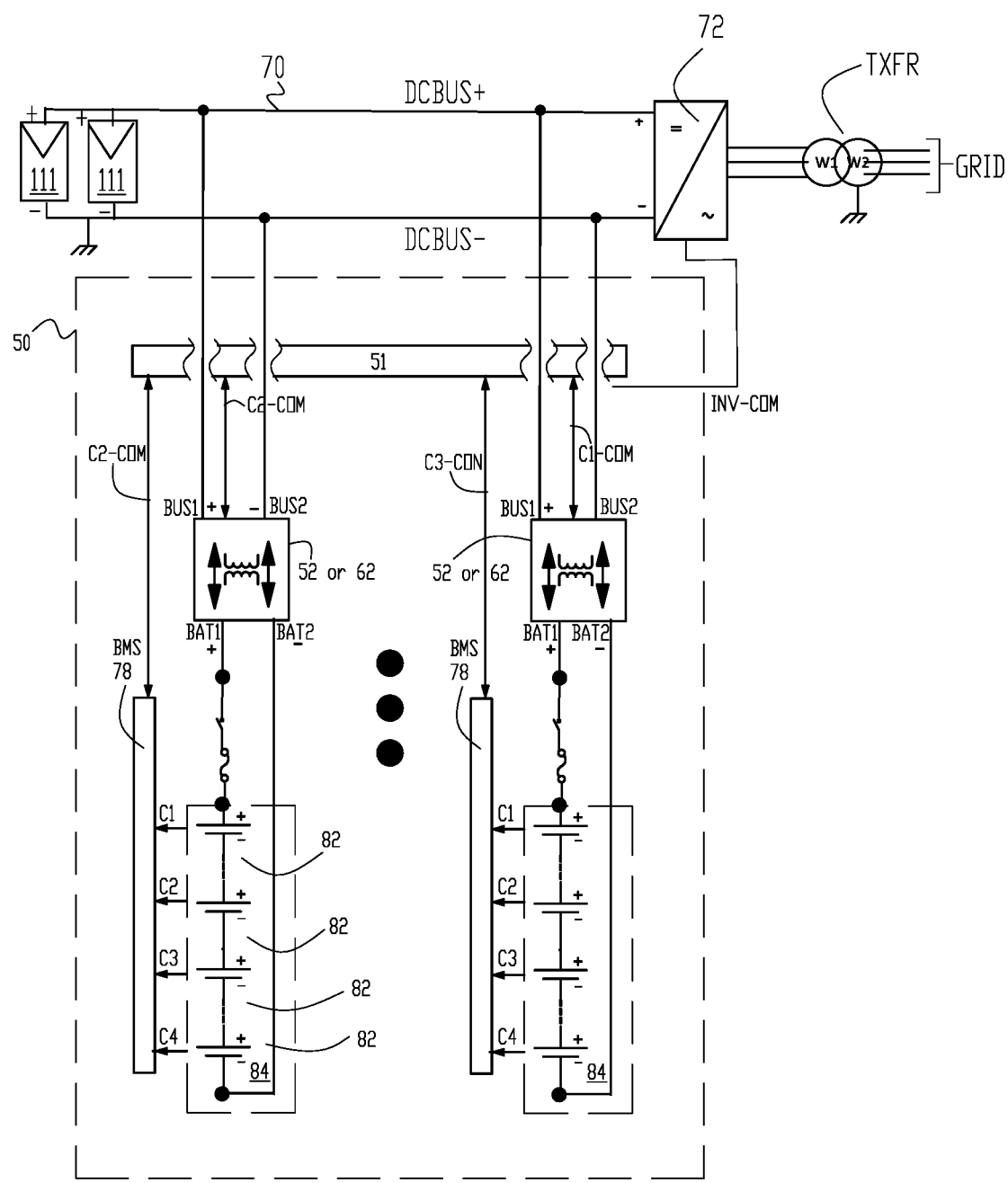
Figure 2D:
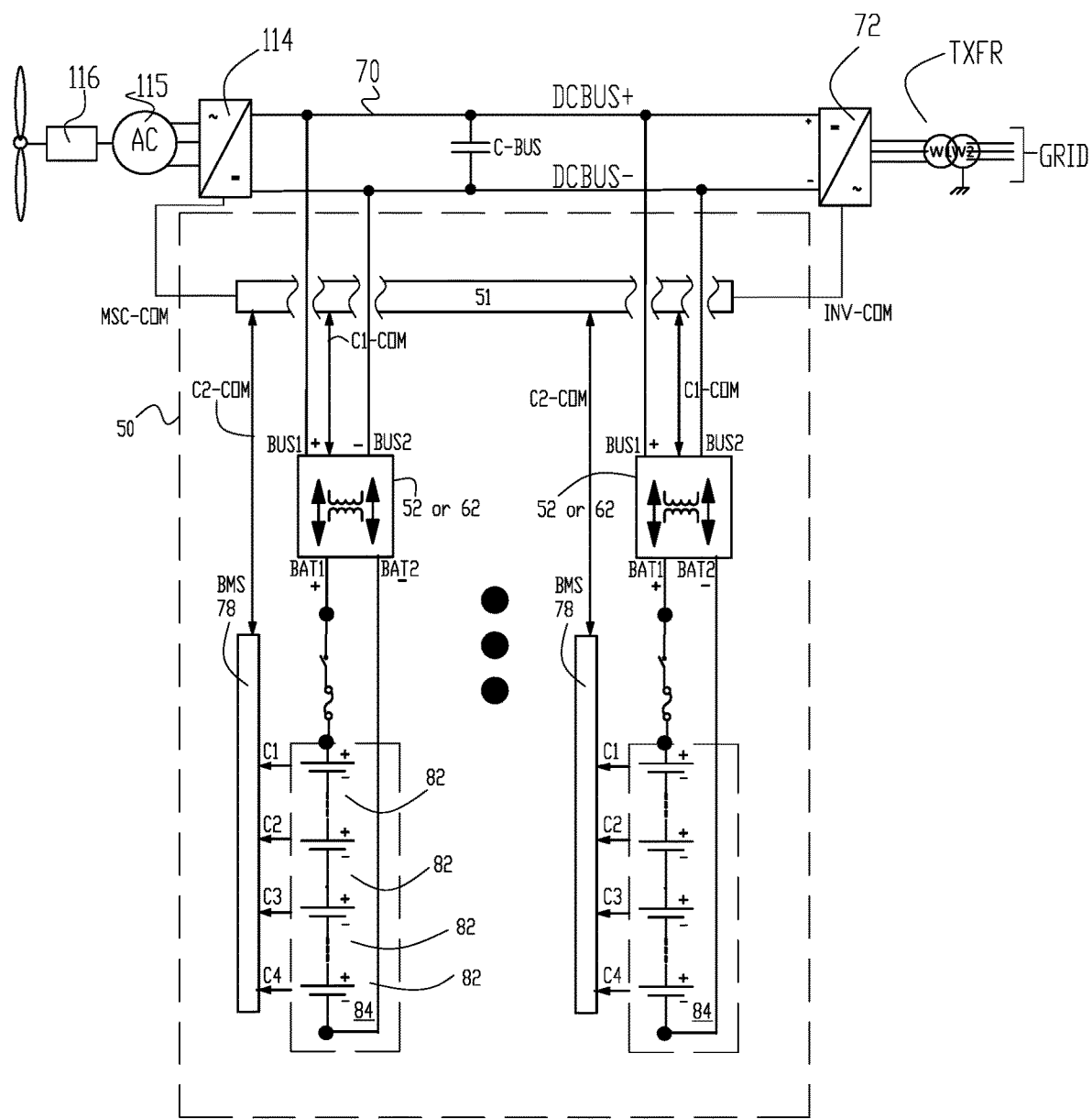

In one aspect the present invention comprises an optimized battery state of health sustaining system for an electrical energy storage intermittently receiving DC power from an alternative DC energy source having a rated output of at least 100 kilowatts and supplying controlled DC power to an alternating current output of a DC-to-AC inverter and transformation network via a common DC bus to an electrical grid. In one embodiment of the invention the optimized battery state of health sustaining system comprises a plurality of bi-directional galvanically isolated current optimizers. Each one of the plurality of bi-directional galvanically isolated current optimizers have a pair of bus terminals connected to the common DC bus and a pair of battery terminals connected to one of a plurality of series connected strings of battery cells. Each one of the plurality of series connected strings of battery cells contained in a separate battery rack whereby each one of the plurality of series connected strings of battery cells is galvanically isolated from the common DC bus. An energy storage system controller is in communication with each one of the plurality of bi-directional galvanically isolated current optimizers for an independent charging control or an independent discharging control of a battery current in each one of the plurality of series connected strings of battery cells.

In another aspect the present invention is a method of sustaining the optimized battery state of health for an electrical energy storage intermittently receiving dc power from an alternative dc energy source having a rated output of at least 100 kilowatts and supplying controlled dc power to an alternating current output of a DC to AC inverter and transformation network via a common dc bus to an electrical grid. A dedicated one of a plurality of bi-directionally galvanically isolated current optimizers is provided between the common dc bus and one of a plurality of series connected strings of battery cells. Each one of the plurality of series connected strings of battery cells contained in a separate battery rack is galvanically isolated from each one of the plurality of series connected strings of the battery cells and the common dc bus. The battery charge current or the battery discharging current is controlled for each one of the plurality of series connected strings of battery cells.

The above and other aspects of the invention are further set forth in this specification and the appended claims.

DETAILED DESCRIPTION OF THE INVENTION

FIG. 2(*a*) is a simplified diagrammatic of one example of an optimized battery state of health sustaining system with galvanic isolation between an energy storage and supply DC bus and a plurality of individual series connected strings of batteries with each of the plurality of individual series connected string of batteries having a separate bi-directional optimizer with galvanic isolation, for example, optimizer 52 in FIG. 3(*a*) and FIG. 3(*b*) or optimizer 62 in FIG. 5(*a*) and FIG. 5(*b*).

FIG. 2(*b*) is a simplified diagrammatic of another example of an optimized battery state of health sustaining system with galvanic isolation between an energy storage and supply DC bus and a plurality of individual series connected string of batteries with each of the plurality of individual series connected string of batteries having a separate bi-directional optimizer. In this example the DC bus is connected to a DC-to-AC inverter or inverter system 72 which is connected to an electrical grid via transformation network TXFR (W1/W2). Communication channels INV-COM includes power supplied to the grid data and DC voltage required by the inverter data.

FIG. 2(*c*) is a simplified diagrammatic of one example of a renewable energy, utility size electric power system for the collection, storage and conversion of solar energy utilizing optimized battery state of health sustaining system 50 in FIG. 2(*a*) with a separate bi-directional charge optimizer with galvanic isolation of the present invention connected between the series string of battery cells in each battery rack 84 and DC bus 70. The separate bi-directional charge optimizer with galvanic isolation in each battery rack containing a series string of battery cells provides equilibrium in charge or discharge of the series string of battery cells in each battery rack connected to the DC bus.

FIG. 2(*d*) is a simplified diagrammatic of one example of a renewable energy, utility size electric power system for the collection, storage and conversion of wind energy utilizing optimized battery state of health sustaining system 50 in FIG. 2(*a*) with a separate bi-directional charge optimizer with galvanic isolation of the present invention connected between the series string of battery cells in each battery rack 84 and DC bus 70. The separate bi-directional charge optimizer with galvanic isolation in each battery rack containing a series string of battery cells provides equilibrium in charge or discharge of the series string of battery cells in each battery rack connected to the DC bus. Communication channels MSC-COM includes wind power generation values to the energy storage system controller 51 for a controller determination of whether to operate in the charge or discharge mode.

Each bi-directional charge optimizer has one or more communication channels C1-COM with energy storage system controller 51 which includes optimizer controller 51. In addition to the typical control functions optimizer controller 51, which is included in the energy storage controller, is in communication with separate bi-directional charge optimizer energy storage system controller by a separate communication channel C1-COM with the energy storage system controller in each battery rack to control command of the battery rack's optimizer circuitry to charge or discharge the optimizer's associated battery rack. Each optimizer's communication channel C1-COM also controls the assignment of the system current rate to charge or discharge the bi-directional charge optimizer's associated battery rack. The bi-directional charge optimizer current rate to charge or discharge is made by optimizer controller 51 based on the value of the SoH reported to the optimizer controller 51 by communication channels C2-COM from the battery management system (BMS) 78. By charging at different current rates the optimized battery state of health sustaining system assures that state of charge of the series string of battery cells in all battery racks are identical which results in equal utilization of the series string of battery cells in all battery racks 84 connected to the DC bus.

Each bi-directional charge optimizer, for example optimizer 52 in FIG. 3(*a*) and FIG. 3(*b*) or optimizer 62 in FIG. 5(*a*) and FIG. 5(*b*), comprises at least one bi-directional DC-to-DC converter with galvanic isolation between the DC bus 70 and the series string of battery cells in battery rack 84. The at least one bi-directional DC-to-DC converter is controlled by a bi-directional charge optimizer processor that can be provided in each bi-directional charge optimizer. In some embodiments of the invention multiple bi-directional DC-to-DC converters with galvanic isolation between the DC bus and the series string of battery cells in a battery rack is provided for a large current capacity series string of battery cells.

FIG. 3(*a*) and FIG. 3(*b*) illustrate one example of a bi-directional charge optimizer 52 with bi-directional DC-to-DC converter having galvanic isolation between the DC bus 70 and a series string of battery cells in a battery rack 84. As shown in the figures the DC-to-DC converter comprises two full-bridges each with four power transistors/diodes with the DC bus galvanically isolated side full bridge comprising power transistors Q1A through Q4A with diodes D1A through D4A, and the battery rack galvanically isolated side full bridge comprising power transistors Q1B through Q4B with diodes D1B through D4B. The optimizer in the figures also includes transformer TX1; four filter capacitors (C1A, C2A, C1B and C2B); and two resonance capacitors (C3A and C3B). Transformer TX1 provides galvanic isolation between DC bus 70 and battery rack 84. Filter capacitors C1A and C2A are connected across the DC bus terminals of the optimizer to stabilize the DC bus, and filter capacitors C1B and C2B are connected across the DC output terminals of the optimizer to stabilize battery voltage terminals. Resonant capacitor C3A is connected in series with the primary transformer winding of transformer TX1 on the DC bus 70 galvanically isolated side of the transformer, and resonant capacitor C3B is connected in series with the secondary transformer winding of transformer TX1 on the battery rack galvanically isolated side. The two resonant capacitors are selected to resonant with the leakage inductance of transformer TX1.

The bi-directional electrically isolated DC-to-DC converter in battery charging mode transfers DC current from the DC bus 70 galvanically isolated side to the battery rack galvanically isolated side which results in charging of the battery cells in the battery rack as illustrated by the dashed lines representing a half cycle of current flow paths (with current directional arrows) in FIG. 3(*a*) when the battery charging process is performed. The bi-directional electrically isolated DC-to-DC converter in battery discharging mode supplies DC current from the battery cells located in the battery rack galvanically isolated side to the DC-to-AC inverter system 72 connected to DC bus 70 which results in discharging of the battery cells in the battery rack as illustrated by the dashed lines representing half a cycle current flow paths (with current directional arrows) in FIG. 3(*b*) when the battery discharging process is performed.

The direction of current flow to perform the charging or discharging process by the bi-directional isolated DC-to-DC converter is controlled by the charge optimizer processor in each bi-directional charge optimizer which generates the required pulse width in a pulse width modulation (PWM) process for gate (driver) pulses to the MOSFET power transistors to perform the appropriate process. Transformer TX1 isolation and the drivers of the power transistors are electrically isolated from control circuitry which allows the controls to be grounded while the input and output terminals are isolated from ground.

In charge process the full bridge formed from Q1A-Q4A/D1A-D4A in galvanically isolated side of the bi-directional electrically isolated DC-to-DC converter connected to the DC Bus operates as an inverter, and the full bridge formed from Q1B-Q4B/D1B-D4B in galvanically isolated side of the bi-directional electrically isolated DC-to-DC converter connected to the battery rack operates as an active rectifier (that is, the current in transistors Q1B to Q4B flows in reverse).

In discharge process, the full bridge formed from Q1A-Q4A/D1A-D4A in galvanically isolated side of the bi-directional electrically isolated DC-to-DC converter connected to the DC bus operates as an active rectifier and the full bridge formed from Q1B-Q4B/D1B-D4B in galvanically isolated side of the bi-directional electrically isolated DC-to-DC converter connected to the battery rack operates as an inverter. The magnitude of the charge or discharge current transfer is controlled by the gate pulses generated in the PWM process to the transistors in the H bridges. The gate pulses on the rectifier bridge are synchronized with the pulses on the inverter bridge to assure reverse conduction of the active rectification transistors.

A galvanic isolated bi-directional DC-to-DC optimizer provides galvanic isolation between DC bus 70 BUS1/BUS2 side and battery rack 84 BAT1/BAT2 side. Galvanic isolation allows the series string of battery cells in each separate battery rack 84 to electrically float from ground potential to minimize leakage current from the battery cells.

Figure 3A:
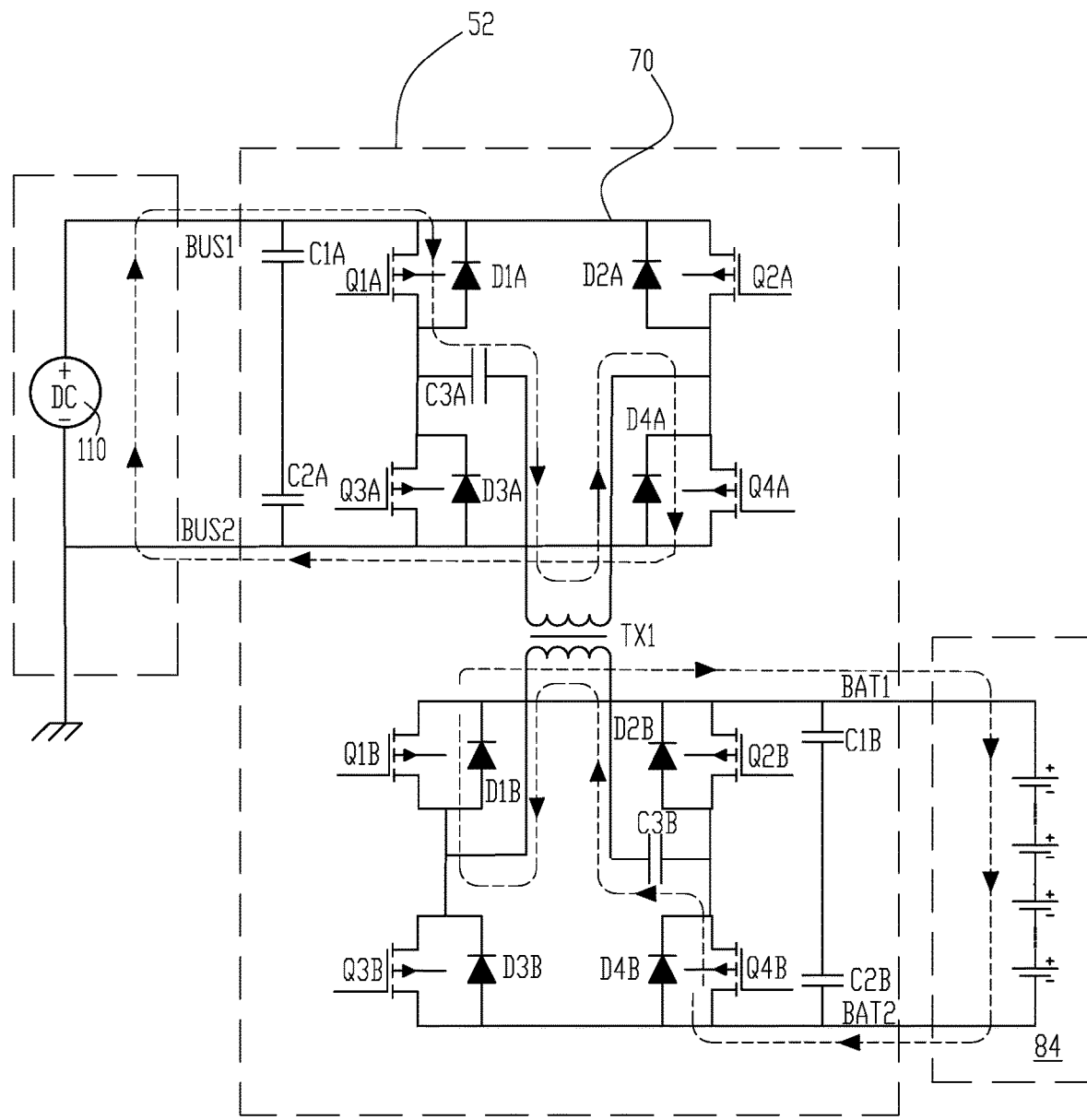
FIG. 3(*a*) diagrammatically illustrates one example of a bi-directional optimizer of the present invention with galvanic isolation between an energy storage and supply DC bus and each one of the plurality of individual series DC bus connected strings of batteries utilizing two full bridge inverters where one of the two full bridge inverters acts as an active rectifier illustrating current flow path when bi-directional optimizer is in a battery charge operational mode.

The DC-to-DC converter in FIG. 3(a) illustrates the charge mode. In this mode the current flows from BUS1/BUS2 side to BAT1/BAT2 side. The gates of the MOSFET transistors Q1A to Q4A of the DC bus 70 galvanically isolated side's H bridge inverter are being switched at near resonant frequency. The transistors Q1A and Q4A are gated simultaneously for a time that is less than one half of the switching period (cycle) illustrated in FIG. 4(a) and FIG. 4(b). The transistors Q2A and Q3A are also gated simultaneously for a time that is less than another one half of the switching period. The transistor gate pulses are shown in correlation with the alternating current flow through the transformer primary winding of transformer TX1 in FIG. 4(a) and FIG. 4(b). When the gate pulse is positive (H) the power transistor conducts. During charge cycle the H bridge Q1A to Q4A operates in inverter mode.

Figure 4A:
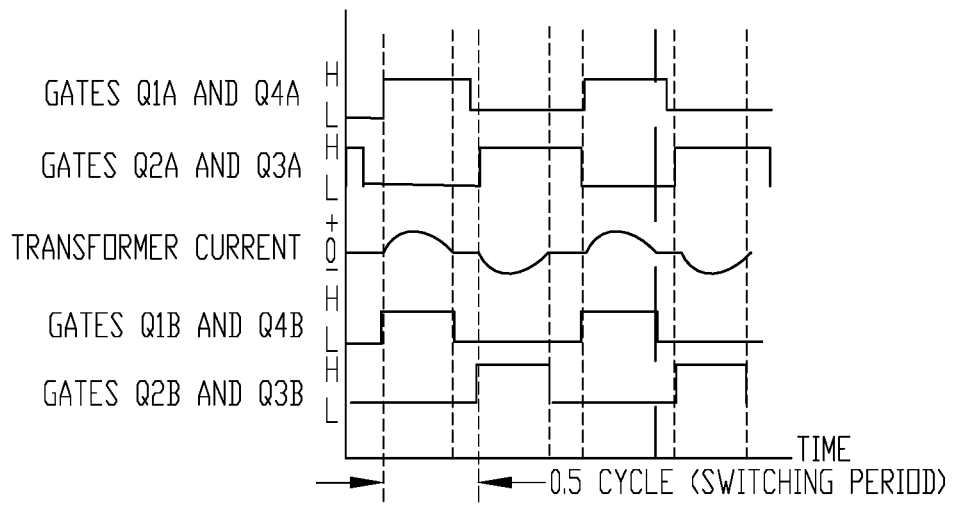
FIG. 4(*a*) is a timing diagram for pertinent components of the bi-directional optimizer with galvanic isolation shown in FIG. 3(*a*) for control of current flow from the DC bus to the plurality of individual series DC bus connected strings of batteries.

During the charge first half period process step, the battery rack 84 galvanically isolated side transistors Q1B to Q4B and diodes D1B to D4B operate as an active rectifier. The current in transformer secondary winding of transformer TX1 initially begins to flow through diodes D2B and D4B as shown in FIG. 3(a). However 50 nanoseconds (ns) after diodes D2B and D4B begin to conduct, the MOSFET parallel transistor Q2B and Q4B are switched on (conduct) and take over the current flowing through the diodes. During the charge second half period process step, the battery rack 84 galvanically isolated side transistors Q2B and Q3B and diodes D2B and D3B operate as an active rectifier. Gate signals on the MOSFET transistors Q1B to Q4B are synchronized with transformer TX1 alternating current as shown in FIG. 4(a). The current through transistors Q1B to Q4B is flowing in reverse from source to drain. This embodiment of the invention is more power efficient than flow of current through by-pass diodes D1B to D4B.

Figure 3B:
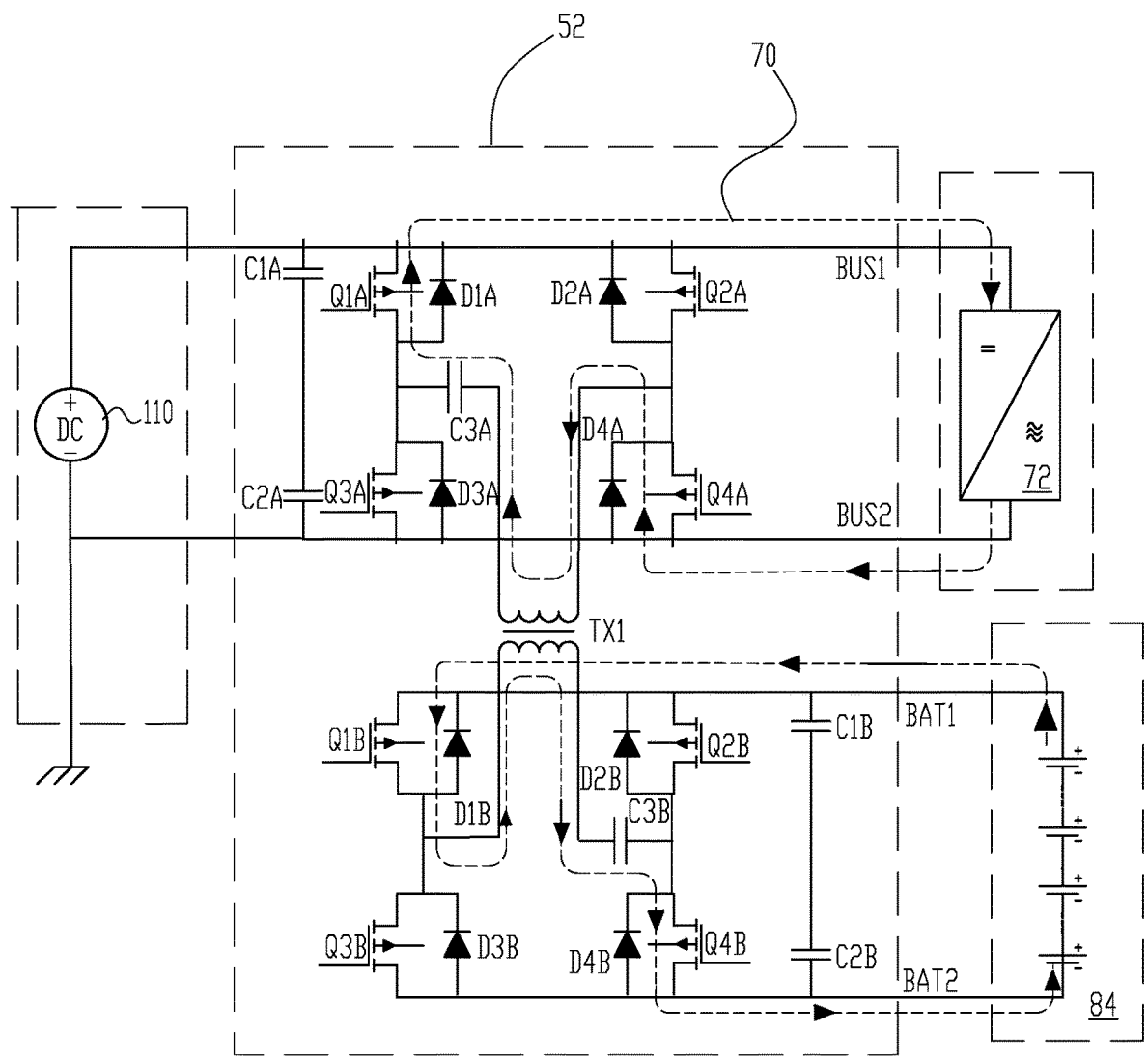

FIG. 3(b) illustrates operation of the isolated DC-to-DC converter shown in the discharge mode. In this mode the current flows from the battery rack 84 into DC bus 70. The gates of the MOSFET transistors Q1B to Q4B in the battery rack 84 galvanically isolated side H bridge inverter are being switched at near resonant frequency. The alternating current flows through the transformer secondary winding of transformer TX1.

Figure 4B:
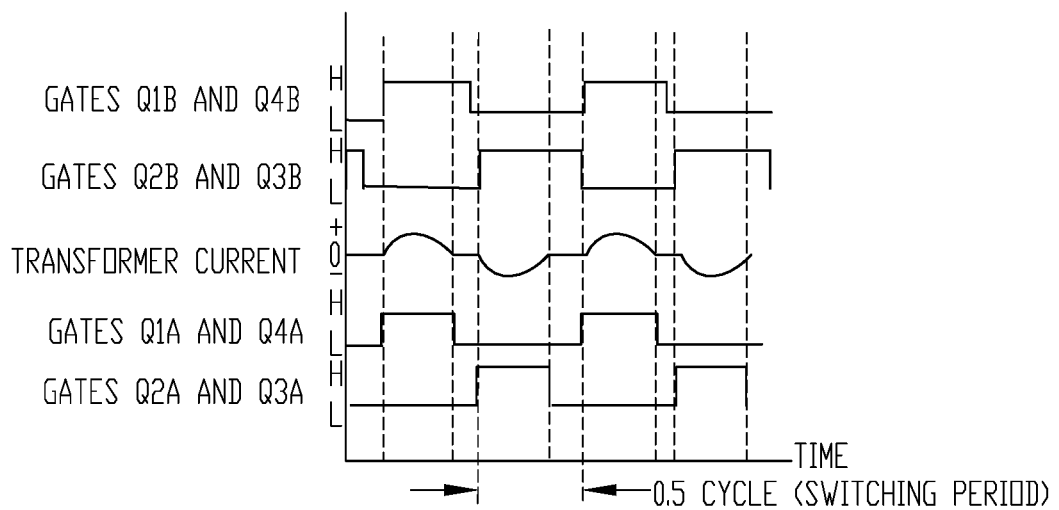

In discharge process the DC bus 70 galvanically isolated side transistors Q1A to Q4A operate as an active rectifier. Gate signals on the MOSFET transistors Q1A to Q4A are synchronized with transformer TX1 alternating current as shown in FIG. 4(b). The current through transistors Q1A to Q4A is flowing in reverse from source to drain. This embodiment of the invention is more power efficient than flow of current through by-pass diodes D1A to D4A.

The control of a bi-directional charge optimizer 52 is performed by the charge optimizer processor in each of the bi-directional electrically isolated DC-to-DC converter. Current (I) is a function of four variables:
(1) H-bridge inverter frequency (F);
(2) H-bridge inverter pulse width (PW) (generated by the PWM process);
(3) Voltage on the inverter bus ($V_{DC\ Bus}$); and
(4) Voltage on the battery ($V_{Battery}$).

That is $I$=function of ($V_{DC\ Bus}$,$V_{Battery}$,F,PW)  (Equation 3)

The values of $V_{DC\ Bus}$ and $V_{Battery}$ are sensed and monitored and variable F and PW are varied to achieve the requested current I according to a PWM process.

In charge mode the bi-directional isolated DC-to-DC converter monitors the DC bus 70 voltage and the battery voltage, and receives a command from the energy storage system controller to set a value of charge current. Based on these four values the charge optimizer processor in the bi-directional electrically isolated DC-to-DC converter computes the value of the operating frequency and inverter pulse duration from the PWM process.

In an alternative energy power system application of the present invention where solar energy is collected, during night time, when solar energy does not produce power, the bi-directional optimizer with galvanic isolation for energy storage systems of the present invention can be operated in the discharge mode. The voltage on battery rack 84 is monitored, but the value of the DC bus and discharge current is requested by the optimizer controller. In this case the bi-directional charge optimizer 52 charges DC bus 70 to the commanded voltage and supplies the requested current to supply to DC-to-AC inverter 72.

Figure 5A:
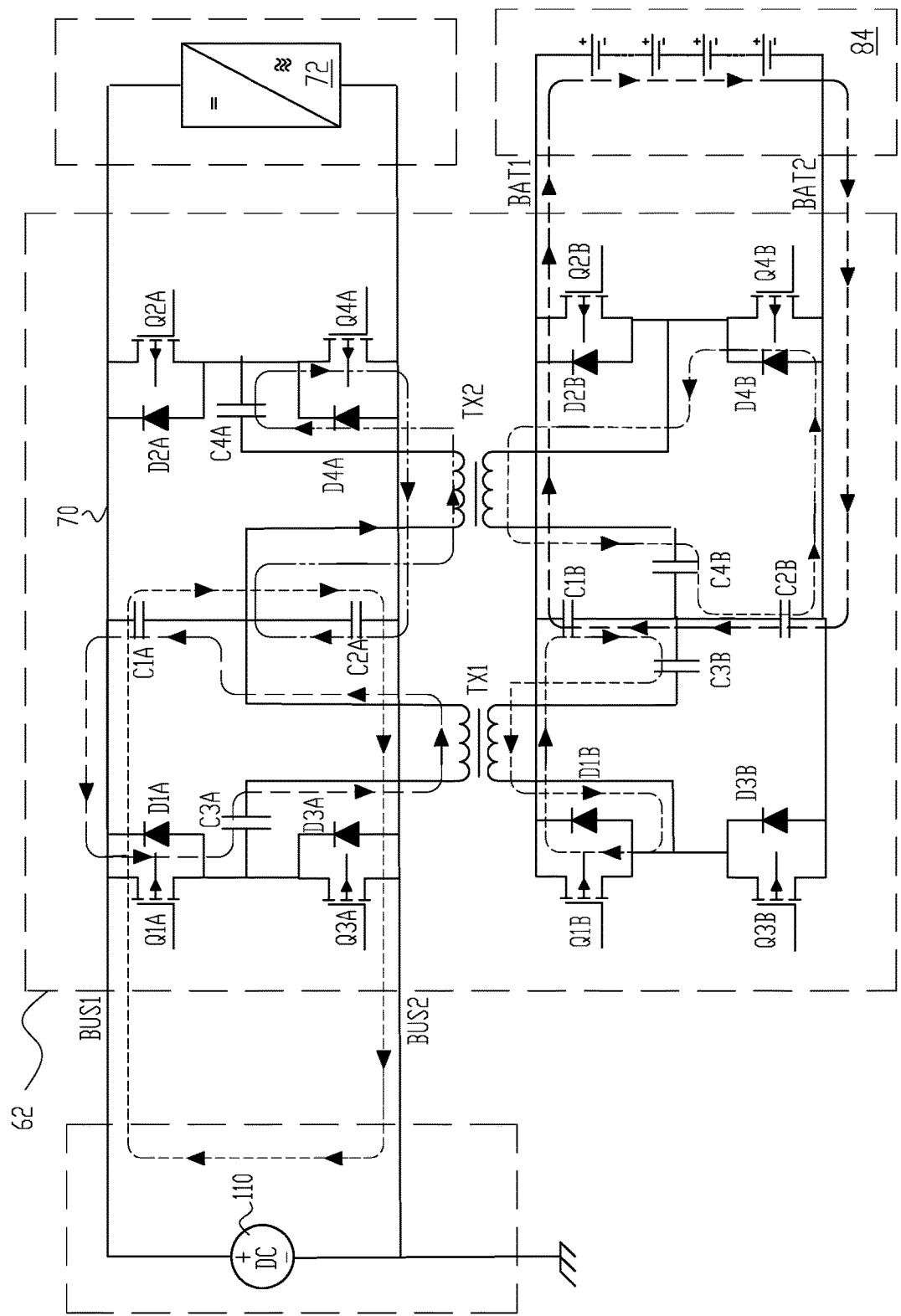
FIG. 5(*a*) diagrammatically illustrates one example of a bi-directional optimizer for storage systems of the present invention utilizing two half-bridge inverters and two active rectifiers in charge operational mode.
Figure 5B:
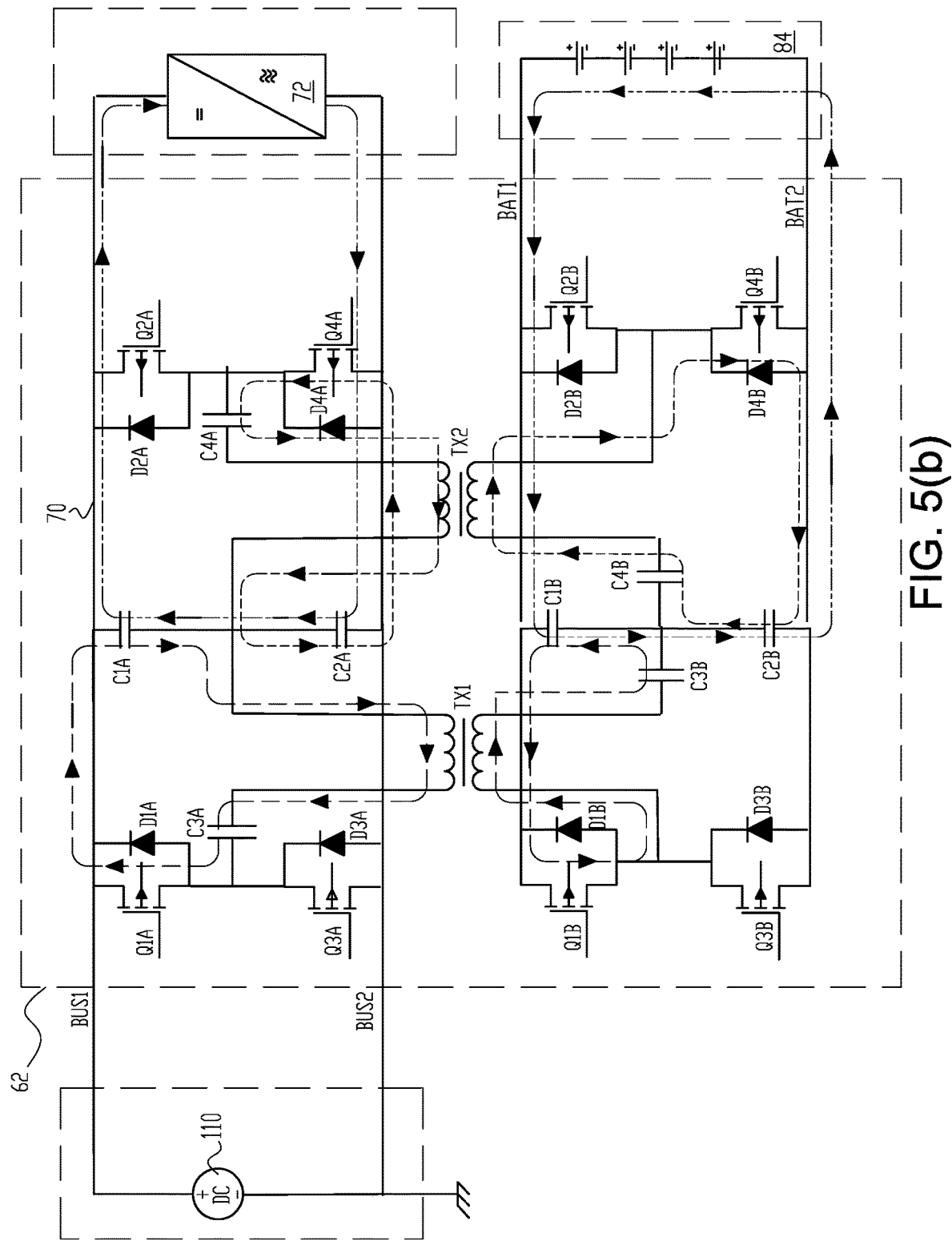

FIG. 5(a) and FIG. 5(b) illustrate another example of a bi-directional charge optimizer 62 with bi-directional DC-to-DC converter having galvanic isolation between the DC bus 70 and a series string of battery cells in a battery rack 84. In this example the isolated DC-to-DC converter comprising double two transistor/diode half bridges (Q1A-Q2A; D1A-D2A; Q1B-Q2B; D1B-D2B), transformers TX1 and TX2, four filter capacitors (C1A, C2A, C1B and C2B), and two resonance capacitors (C3A and C3B). A pair of filter capacitors (C1A and C2A) is connected across DC input terminals, and a pair of filter capacitors (C1B and C2B) is connected across DC output terminals to stabilize DC input/output voltages. One resonant capacitor C3A is connected in series with the primary transformer winding terminal. The second terminal of transformer primary winding is connected to the midpoint of the filter capacitors C1A and C2A. The second C3B resonant capacitor is connected in series with the secondary transformer winding. The second terminal of transformer secondary winding is connected to the midpoint of the filter capacitors C1B and C2B. The resonant capacitors form a resonance loops with the leakage inductances of the transformers TX1 and TX2, and allow controlling the transformer current via variation of a bridge switching frequency.

The DC-to-DC converter in FIG. 5(a) illustrates the charge mode. In this mode the current flows from BUS1/BUS2 side to BAT1/BAT2 side. The gates of the MOSFET transistors Q1A-Q4A of the DC bus 70 galvanically isolated side two half-H bridge inverters are being switched at near resonant frequency. The transistors Q1A and Q4A are gated simultaneously for a time that is less than one half of the switching period as shown in FIG. 4(a). The transistors Q2A and Q3A are also gated simultaneously for a time that is less than another one half of the switching period. The AC current flows through transformers TX1 and TX2 primary windings as shown in FIG. 5(a) and FIG. 5(b). When the pulse is positive the power transistor on (conducts). During charge cycle the half bridges Q1A and Q4A, and Q2A and Q3A operate in inverter mode.

The inverter is discharging capacitors C1A and C2A. The charge in these capacitors is replenished by the current from alternative power source 110 through DC bus 70.

During the charge first half period process step, the battery rack 84 galvanically isolated side transistors Q1B and Q4B and diodes D1B and D4B operate as two active rectifiers. The current in the transformers' secondary windings initially begin to flow through the diodes D1B and D4B in each of the half bridge inverters as shown in FIG. 5(a). However 50 nanoseconds (ns) after diodes D1B and D4B begin to conduct, the MOSFET parallel transistor Q1B and Q4B are switched ON taking over the diode currents. During the charge second half period process step, the battery rack 84 galvanically isolated side transistors Q2B and Q3B and diodes D2B and D3B operate as an active rectifier. Gate signals on the MOSFET transistors Q1B and Q4B are synchronized with the AC transformer current as shown in FIG. 4(b). The current through transistors Q1B-Q4B is flowing in reverse from source to drain. The currents in Q1B and Q4B are charging capacitors C1B and C2B. Then the charge is then transferred to the battery rack 84 via terminals BAT1 and BAT2. This embodiment of the invention is more power efficient than flow of current through by-pass diodes D1B-D4B.

FIG. 5(b) illustrates operation of the isolated DC-to-DC converter shown in the discharge mode. In this mode the current flows from the battery rack 84 into DC bus 70. The gates of the MOSFET transistors Q1B-Q4B of the DC battery rack 84 galvanically isolated side two half-H bridge inverters are being switched at near resonant frequency. The AC current flows through the transformers' secondary windings. The inverters Q1B-Q4B and Q2B-Q3B discharge capacitors C1B and C2B. The charge is being replenished from battery rack 84.

In discharge process the DC bus 70 galvanically isolated side two half bridges with transistors Q1A-Q4A operate as active rectifiers. Gate signals on the MOSFET transistors Q1A-Q4A are synchronized with the AC transformer current as shown in FIG. 4(b). The current through transistors Q1A-Q4A is flowing in reverse from source to drain. The currents in Q1A and Q4A are charging the capacitors C1A and C2A. Then the charge is transferred to the AC-to-DC inverter 72 terminals BUS1 and BUS2. This embodiment of the invention is more power efficient than flow of current through by-pass diodes D1A-D4A.

In the half bridge implementation the transformer windings and the resonant capacitors are exposed to 50 percent of the DC voltage. However in the half bridge implementation the bi-directional optimizer with galvanic isolation transfers only 50 percent of power at the same current flow.

Figure 6:
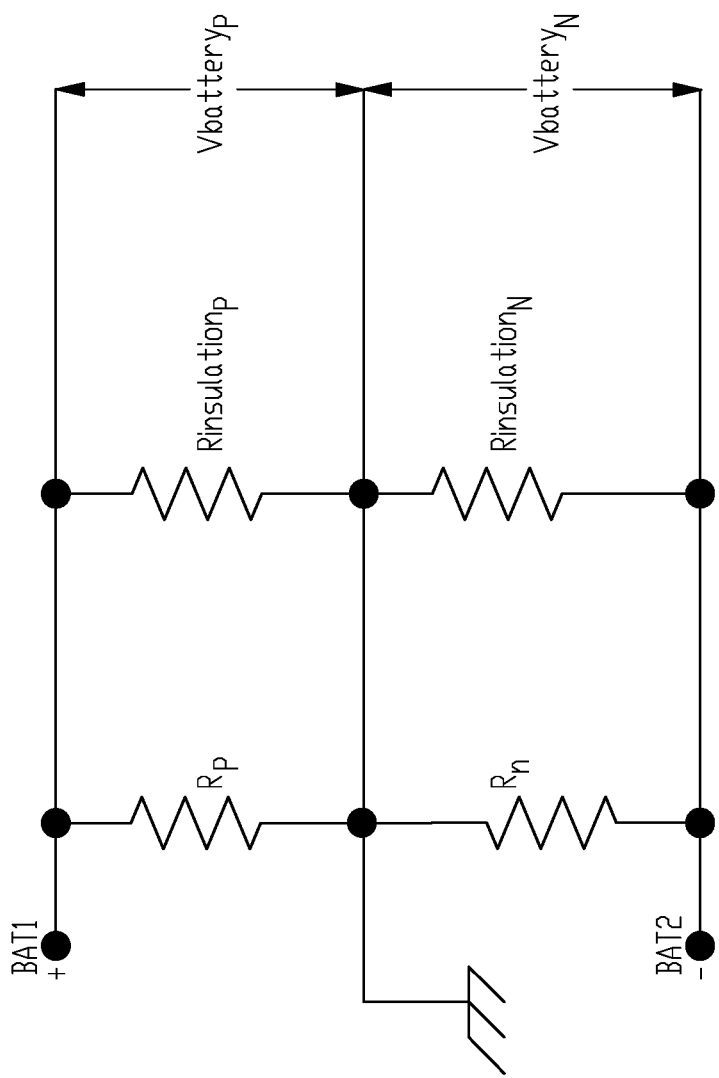
FIG. 6 is one example of an insulation resistance monitor circuit for monitoring the insulation resistance from between a battery rack positive terminal and a battery rack positive terminal to earth ground utilized in some examples of a bi-directional galvanically isolated optimizer of the present invention.

As illustrated in FIG. 6, positive battery rack terminal (BAT1) and negative battery terminal (BAT2) are insulated from earth ground by unknown values Rinsulation$_P$ and Rinsulation$_N$. Some embodiments of an energy storage system controller of the present invention further comprises an insulation resistance monitor circuit for monitoring the insulation resistance from the positive battery rack positive terminal and the negative battery rack terminal to earth ground. In a simplified circuit of the insulation resistance monitor shown in FIG. 6, the positive battery rack terminal (BAT1) and the negative battery rack terminal (BAT2) are connected to earth potential (ground) via installed resistors R$_p$ and R$_n$. The positive and negative continuous battery rack terminal voltages (Vbattery$_P$ and Vbattery$_N$) are inputted to the insulation resistance monitor and monitored. The insulation resistance monitor determines the unknown values of Rinsulation$_P$ and Rinsulation$_N$ by executing an insulation resistance software program that performs the calculations according to Equations (4) and (5).

$$Rinsulation_P = \frac{Vbattery_p * R_P}{(Vbattery_p * R_p / R_n - Vbattery_p)} \quad \text{(Equation 4)}$$

$$Rinsulation_N = \frac{Vbattery_N * R_N}{(Vbattery_N * R_n / R_p - Vbattery_N)} \quad \text{(Equation 5)}$$

In some embodiments of the invention each separate battery rack has an insulation resistance monitor. The purpose of the battery rack insulation resistance monitoring is to estimate leakage current from the battery rack positive and negative terminals to earth.

$$I_{leakagea-P} = \frac{Vbattery_p}{Rinsulation_P} \quad \text{(Equation 6)}$$

$$I_{leakagea-N} = \frac{Vbattery_N}{Rinsulation_N} \quad \text{(Equation 7)}$$

If leakage current (either $I_{leakage-P}$ or $I_{leakage-N}$) exceeds a preset value the battery rack is disconnected.

In summary the term renewable energy electric storage power system as used herein refers to utility-size array of batteries capable to accumulate electrical charge and release this charge at controlled rate. The individual battery cells are connected in series forming racks of batteries. The racks of batteries are connected in parallel forming an array of batteries. The bi-directional optimizer with galvanic isolation has bi-directional power flow capability: from input terminals to the output terminals and from output terminals to the input to terminals. Each bi-directional charge optimizer has at least one pair of terminals connected to the DC bus of at least one pair of terminals connected to one rack of batteries. During the charge process the bi-directional charge optimizer controls flow of the electrical current from DC bus to the strings of batteries. During the discharge process the Bi-directional optimizer with galvanic isolation controls flow of the electrical current from the strings of batteries to DC bus. The present invention provides fine-tuning controlled charge/discharge systems for a high voltage, renewable energy harvesting network in combination with a centralized battery storage wherein the excess harvested renewable energy is distributively stored and discharged in high voltage strings batteries assuring equilibrium state of charge in in each battery string. The present invention provides galvanic isolation between the battery rack and common DC distribution bus. The present invention provides galvanic isolation among the battery racks forming a battery array. The present invention provides monitors for insulation resistance of battery racks to ground potential.

The invention claimed is:

1. An optimized battery state of health sustaining system for an electrical energy storage intermittently receiving a DC power from an alternative DC energy source having a rated output of at least 100 kilowatts and supplying a controlled DC power to an alternating current output of a DC-to-AC inverter and a transformation network via a common DC bus to an electrical grid, the optimized battery state of health sustaining system comprising:
   a plurality of bi-directional galvanically isolated current optimizers, each one of the plurality of bi-directional galvanically isolated current optimizers having a pair of bus terminals connected to the common DC bus and a pair of battery terminals connected to one of a plurality of series connected strings of battery cells, each one of the plurality of series connected strings of battery cells contained in a separate battery rack whereby each one of the plurality of series connected strings of battery cells is galvanically isolated from the common DC bus; and
   an energy storage system controller further comprising an optimizer controller, in communication with each one of the plurality of bi-directional galvanically isolated current optimizers for an independent charging control or an independent discharging control of a battery current in each one of the plurality of series connected strings of battery cells.

2. An optimized battery state of health sustaining system of claim 1 wherein the separate battery rack comprises a plurality of battery modules for a distributed containment of each one of the plurality of series connected strings of battery cells.

3. An optimized battery state of health sustaining system of claim 1 further comprising an insulation resistance monitor circuit for monitoring an insulation resistance from a battery rack positive terminal and a battery rack negative terminal to an earth ground of the separate battery rack.

4. An optimized battery state of health sustaining system of claim 1 further comprising a separate charge optimizer processor integrated in each one of the plurality of bi-directional galvanically isolated current optimizers, the separate charge optimizer processor in communication with the energy storage system controller and a battery management system.

5. An optimized battery state of health sustaining system of claim 4 wherein each of the plurality of bi-directional galvanically isolated current optimizers comprises at least one galvanically isolated DC-to-DC converter.

6. An optimized battery state of health sustaining system of claim 5 wherein the at least one galvanically isolated DC-to-DC converter comprises at least one combination full H bridge inverter and active rectifier full H bridge, the at least one combination full H bridge inverter and active rectifier full H bridge comprising a plurality of silicon carbide MOSFET power transistors and silicon carbide diodes.

7. An optimized battery state of health sustaining system of claim 6 further comprising the energy storage system controller and the battery management system in communication with the optimizer controller, the optimizer controller in communication with the at least one combination full H bridge inverter and active rectifier full H bridge for a selective operational control of the at least one combination full H bridge inverter and active rectifier full H bridge between a full H bridge inverter mode and a full H bridge active rectifier mode.

8. An optimized battery state of health sustaining system of claim 7 further comprising a gate pulse generator circuit in the optimizer controller for generating a plurality of gate pulses to the at least one combination full H bridge inverter and active rectifier full H bridge for the selective operational control of the at least one combination full H bridge inverter and active rectifier full H bridge between the full H bridge inverter mode and the full H bridge active rectifier mode.

9. An optimized battery state of health sustaining system of claim 8 wherein a frequency and a pulse width of the plurality of gate pulses are responsive to a battery charge current mode and a current charging magnitude command or a battery discharge current mode and a current discharging magnitude command from the energy system storage system controller.

10. An optimized battery state of health sustaining system of claim 5 wherein the at least one galvanically isolated DC-to-DC converter comprises at least two combination half-H bridge inverter and active rectifier half-H bridge, the at least two combination half-H bridge inverter and active rectifier half-H bridge comprising a plurality of silicon carbide MOSFET power transistors and silicon carbide diodes.

11. An optimized battery state of health sustaining system of claim 10 further comprising the energy storage system controller and the battery management system in communication with the optimizer controller, the optimizer controller in communication with the at least two combination half-H bridge inverter and active rectifier half-H bridge for a selective operational control of the at least two combination half-H bridge inverter and active rectifier half-H bridge between a half-H bridge inverter mode and half-H bridge active rectifier mode.

12. An optimized battery state of health sustaining system of claim 11 further comprising a gate pulse generator circuit in the optimizer controller for generating a plurality of gate pulses to the at least two combination half-H bridge inverter and active rectifier half-H bridge for the selective operational control of the at least two combination half-H bridge inverter and active rectifier half-H bridge between the half-H bridge inverter mode and the half-H bridge active rectifier mode.

13. An optimized battery state of health sustaining system of claim 12 wherein a frequency and a pulse width of the plurality of gate pulses are responsive to a battery charge current mode and a current charging magnitude command or a battery discharge current mode and a current discharging magnitude command form the energy system storage system controller.

14. A method of sustaining the optimized battery state of health for an electrical energy storage intermittently receiving a DC power from an alternative DC energy source having a rated output of at least 100 kilowatts and supplying a controlled DC power to an alternating current output of a DC-to-AC inverter and a transformation network via a common DC bus to an electrical grid, the method comprising:
   providing a dedicated one of a plurality of bi-directionally galvanically isolated current optimizers between the common DC bus and each one of a plurality of series connected strings of battery cells, each one of the plurality of series connected strings of battery cells contained in a separate battery rack to galvanically isolate each one of the plurality of series connected strings of the battery cells from the common DC bus; and independently controlling a battery charge current or a battery discharging current for each one of the plurality of series connected strings of battery cells.

15. The method of claim 14 further comprising monitoring a positive battery rack terminal resistance from earth ground and a negative battery rack terminal resistance from earth ground for each one of a plurality of battery racks and disconnecting one or more of the plurality of battery racks if the positive or negative battery rack terminal resistance from earth ground if a leakage current exceeds a preset leakage current value.

16. The method of claim 14 wherein each one of the plurality of bi-directionally galvanically isolated current optimizers comprises a pair of full H bridges electrically isolated by a transformer with the pair of full H bridges comprising a DC bus connected full H bridge and a dedicated series string of battery cells connected full H bridge, the method further comprising either operating each one of the plurality of bi-directionally galvanically isolated current optimizers in a battery charging mode or a battery discharging mode;

the battery charging mode comprising operating the DC bus connected full H bridge in a DC bus connected inverter mode and operating the dedicated series string of battery cells connected full H bridge in a battery cells connected active rectifier mode; and the battery discharging mode comprising operating the DC bus connected full H bridge in a DC bus connected active rectifier mode and operating the dedicated series string of battery cells connected full H bridge in a battery cells connected inverter mode.

17. The method of claim 16 further comprising generating a plurality of gate pulses to the pair of full H bridges for a selective operational control in the battery charging mode or the battery discharging mode.

18. The method of claim 14 wherein each one of the plurality of bi-directionally galvanically isolated current optimizers comprises a double half bridges electrically isolated by a transformer with the double half bridges comprising a DC bus connected half bridges and a dedicated series string of battery cells connected half bridges, the method further comprising either operating each one of the bi-directionally galvanically isolated current optimizers in a battery charging mode or a battery discharging mode;

the battery charging mode comprising operating the DC bus connected half bridges in a DC bus connected inverter mode and operating the dedicated series of battery cells connected half bridges in a battery cells connected active rectifier mode; and the battery discharging mode comprising operating the DC bus connected half bridges in a DC bus connected active rectifier mode and operating the dedicated series of battery cells connected half bridges operating in a battery cells connected inverter mode.

19. The method of claim 18 further comprising generating a plurality of gate pulses to the double half bridges for a selective operational control in the battery charging mode or the battery discharging mode.

20. An optimized battery state of health sustaining system for an electrical energy storage intermittently receiving a DC power from an alternative DC energy source having a rated output of at least 100 kilowatts and supplying a controlled DC power to an alternating current output of a DC-to-AC inverter and a transformation network via a common DC bus to an electrical grid, the optimized battery state of health sustaining system comprising:

a plurality of bi-directional galvanically isolated current optimizers, each one of the plurality of bi-directional galvanically isolated current optimizers comprising at least one galvanically isolated DC-to-DC converter and having a pair of bus terminals connected to the common DC bus and a pair of battery terminals connected to one of a plurality of series connected strings of battery cells, each one of the plurality of series connected strings of battery cells contained in a separate battery rack comprising a plurality of battery modules for a distributed containment of each one of the plurality of series connected strings of battery cells whereby each one of the plurality of series connected strings of battery cells is galvanically isolated from the common DC bus;

a separate charge optimizer processor integrated in each one of the plurality of bi-directional galvanically isolated current optimizers, the separate charge optimizer processor in communication with an energy storage system controller and a battery management system; and the energy storage system controller further comprising an optimizer controller, the optimizer controller in communication with each one of the plurality of bi-directional galvanically isolated current optimizers for an independent charging control or an independent discharging control of a battery current in each one of the plurality of series connected strings of battery cells.

* * * * *